(12) United States Patent
Zhang et al.

(10) Patent No.: US 9,769,475 B2
(45) Date of Patent: Sep. 19, 2017

(54) ENHANCED REFERENCE REGION UTILIZATION FOR SCALABLE VIDEO CODING

(71) Applicant: Intel Corporation, Santa Clara, CA (US)

(72) Inventors: Wenhao Zhang, Beijing (CN); Yi-Jen Chiu, San Jose, CA (US); Lidong Xu, Beijing (CN); Yu Han, Beijing (CN); Zhipin Apple Deng, Beijing (CN); Xiaoxia Cai, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/997,935

(22) PCT Filed: Sep. 28, 2012

(86) PCT No.: PCT/CN2012/082339
§ 371 (c)(1),
(2) Date: Jun. 25, 2013

(87) PCT Pub. No.: WO2014/047885
PCT Pub. Date: Apr. 3, 2014

(65) Prior Publication Data
US 2014/0286409 A1    Sep. 25, 2014

(51) Int. Cl.
*H04N 19/105* (2014.01)
*H04N 19/61* (2014.01)
(Continued)

(52) U.S. Cl.
CPC ..... *H04N 19/00793* (2013.01); *H04N 19/105* (2014.11); *H04N 19/139* (2014.11);
(Continued)

(58) Field of Classification Search
CPC .. H04N 7/12; H04N 11/02–11/04; H04B 1/66
See application file for complete search history.

(56) References Cited

U.S. PATENT DOCUMENTS

| 5,742,343 A | 4/1998 | Haskell et al. | |
|---|---|---|---|
| 2002/0089610 A1* | 7/2002 | Ohno | H04H 60/72 348/734 |

(Continued)

FOREIGN PATENT DOCUMENTS

| CN | 1636407 A | 7/2005 |
|---|---|---|
| EP | 1364534 | 11/2003 |
| WO | 2006078115 | 7/2006 |

OTHER PUBLICATIONS

International Search Report and Written Opinion received for PCT Patent Application No. PCT/CN2012/082339, mailed on Jul. 11, 2013, 11 pages.

(Continued)

*Primary Examiner* — Behrooz Senfi
*Assistant Examiner* — Maryam Nasri
(74) *Attorney, Agent, or Firm* — Green, Howard & Mughal LLP.

(57) ABSTRACT

Techniques to identify one or more candidate reference blocks used to generate a prediction block to encode a current coding block. The candidate reference blocks can be in the same layer as the current coding block or a different layer. In addition, the candidate reference blocks do not have to be co-located with the current coding block. Motion vectors and shift vectors can be used to identify the one or more candidate reference blocks. In addition, uniform and non-uniform weighting can be applied to the one or more candidate reference blocks to generate the prediction block. Accordingly, an encoder can determine and identify reference blocks to a decoder that can provide desirable rate-distortion cost.

19 Claims, 7 Drawing Sheets

(51) Int. Cl.
- H04N 19/139 (2014.01)
- H04N 19/176 (2014.01)
- H04N 19/70 (2014.01)
- H04N 19/147 (2014.01)
- H04N 19/30 (2014.01)

(52) U.S. Cl.
CPC ......... *H04N 19/147* (2014.11); *H04N 19/176* (2014.11); *H04N 19/30* (2014.11); *H04N 19/61* (2014.11); *H04N 19/70* (2014.11)

(56) References Cited

U.S. PATENT DOCUMENTS

| | | | | |
|---|---|---|---|---|
| 2004/0008782 | A1* | 1/2004 | Boyce | H04N 19/197 375/240.16 |
| 2005/0129127 | A1* | 6/2005 | Jeon | H04N 19/00 375/240.16 |
| 2005/0201627 | A1* | 9/2005 | Liang | H04N 19/197 382/239 |
| 2006/0233263 | A1* | 10/2006 | Park | H04N 19/70 375/240.25 |
| 2008/0089411 | A1 | 4/2008 | Wenger et al. | |
| 2009/0026367 | A1 | 1/2009 | Cheung et al. | |
| 2011/0243231 | A1 | 10/2011 | Li et al. | |

OTHER PUBLICATIONS

Notice of Preliminary Rejection (Non-Final) for Korean Patent Application No. 10-2015-7004926, issued on Mar. 31, 2016. No Translation available.

Notice of Reasons for Rejection for Japanese Patent Application No. 2015-532270, issued on Mar. 8, 2016. Translation.

Extended European Search Report for European Patent Application No. 12885325.6, issued Apr. 26, 2016.

Kamp, S et al., "Local adaptation of leak factor in AR-FGS", Joint Video Team (JVT) of ISO/IEC MPEG & ITU-T (ISO/IEC JTC1/SC29/WG11 and ITU-T SG16 Q 6) 19$^{th}$ Meeting, Geneva, Switzerland Mar. 31-Apr. 7, 2006, JVT-S092.

Kim, Seung Hwan et al., "Adaptive multiple reference frame based scalable video coding algorithm", International Conference on Image Processing (ICIP), IEEE, vol. 2, Sep. 22, 2002, pp. 33-36.

Park, Chun-Su et al., "Estimation-Based Interlayer Intra Prediction for Scalable Video Coding", IEEE Transactions on Circuits and Systems for Video Technology, IEEE Service Center, vol. 19, No. 12, Dec. 1, 2009, Piscataway, NJ, US, pp. 1902-1907.

Park, Seung-Wook et al., "Intra BL prediction considering phase shift", Joint Video Team (JVT) of ISO/IEC MPEG & ITU-T (ISO/IEC JTC1/SC29/WG11 and ITU-T SG16 Q.6) 15th Meeting, Busan, KR Apr. 16-22, 2005, JVT-O023.

Wang, Tae-Shick et al., "Improved inter-layer intra prediction for scalable video coding", TENCON 2007, 2007 IEEE Region 10 Conference, Oct. 30, 2007, pp. 1-4.

Notice of Last Preliminary Rejection for Korean Patent Application No. 10-2015-7004926, mailed on Nov. 17, 2016. Translation Summary provided.

International Preliminary Report on Patentability for International Patent Application No. PCT/CN2012/082339, mailed on Apr. 9, 2015.

Notice of Allowance for Korean Patent Application No. 10-2015-7004926, dated May 2, 2017. Translation provided.

* cited by examiner

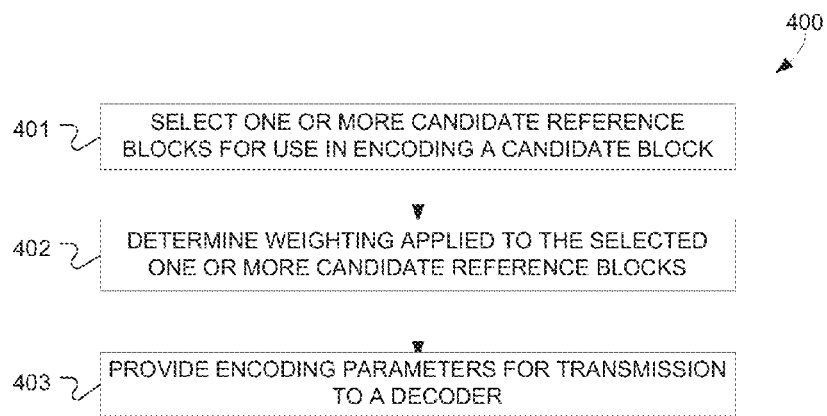

FIG. 4

| coding_unit_scalable_extension( x0, y0, log2CbSize ) { | Descriptor |
|---|---|
|   if ( inter_layer_prediction_flag ) { /* inter-layer prediction related syntax */ | |
|     for ( layerId = 0; layerId < max_scalable_reference_layer_num; layerId++ ) { | |
|       inter_layer_reference_block_num[layerId] | ae(v) |
|       for ( blockId = 0; blockId < inter_layer_reference_block_num[layerId]; blockId++ ) { | |
|         shift_vector_hor[layerId][blockId] | ae(v) |
|         shift_vector_ver[layerId][blockId] | ae(v) |
|         if ( weighting_factors_transmitted_flag ) { | |
|           weighting_factor[layerId][blockId] | ae(v) |
|         } | |
|       } | |
|     } | |
|     if ( offset_factor_transmitted_flag ) { | |
|       offset_factor | ae(v) |
|     } | |
|   } | |
|   ... | |
| } | |

FIG. 6

ENHANCED REFERENCE REGION UTILIZATION FOR SCALABLE VIDEO CODING

BACKGROUND ART

High Efficient Video Coding (HEVC) is an evolving video compression standard that is under development by the Joint Collaborative Team on Video Coding (JCT-VC) formed by ISO/IEC Moving Picture Experts Group (MPEG) and ITU-T Video Coding Experts Group (VCEG). As with previous video coding standards, HEVC describes use of basic modules such as intra/inter prediction, transform, quantization and in-loop filtering and entropy coding. JCT-VC is planning to add a Scalable Video Coding (SVC) extension into the HEVC standard. The SVC extension of HEVC can potentially cope with the heterogeneity of networks and devices in a video service environment.

BRIEF DESCRIPTION OF THE DRAWINGS

FIG. 4 depicts an example process used by an encoder to encode a block.

FIG. 6 depicts an example manner to transport reference block indices and shift vectors to a decoder.

DESCRIPTION OF THE EMBODIMENTS

For encoding video, HEVC defines Coding Units (CUs), which are used to sub-partition a picture into rectangular blocks having variable size. Within each CU, a quad-tree based splitting scheme can be used to specify the CU partition pattern. In addition, HEVC defines Prediction Units (PUs) and Transform Units (TUs) to specify how to divide a CU for prediction and transform, respectively. After intra or inter prediction, a transform is applied to the residual blocks to generate coefficients. Next, coefficients are quantized, scanned into one-dimensional order, and context-adaptive binary arithmetic coding (CABAC) coded.

An SVC bit stream contains several decodable subset bit streams. The subset bit streams represent source video content with different resolution, frame rate, quality, bit depth, and so forth. Scalability can be achieved by using a multi-layer coding structure. In an SVC system, there is one Base Layer (BL) and several Enhancement Layers (ELs).

Figure 1:
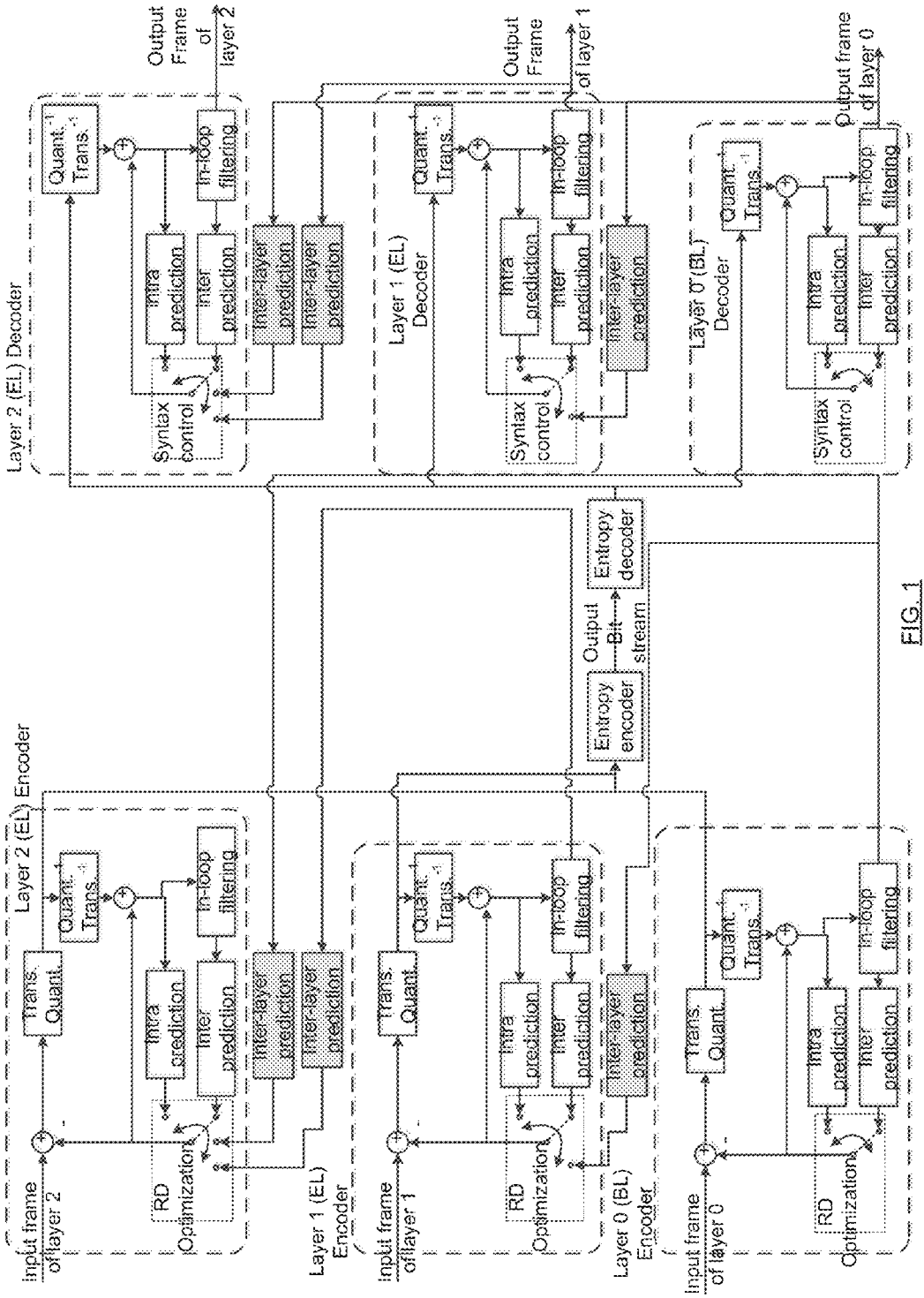
FIG. 1 shows an example system that generates one base layer and two enhancement layers.

FIG. 1 shows an example system that generates one BL and two ELs. The BL can be coded according to HEVC. When an EL has a layer identifier equal to N, all the layers with layer identifier less than N are available. Blocks belonging to an EL can be predicted using Inter-Layer Reference Blocks (ILRBs) which are from lower layer pictures or by Temporal Reference Blocks (TRBs) which are from previously coded pictures in the same layer. The term "block" can be interchangeable with "region." A "block" can be any shaped pixel region, such as square, rectangle, triangle, circle, and so forth.

Although not depicted, each of the encoders and the decoder can include a controller that initiates operations of each element, including but not limited to the transmission of the output bit stream by a radio or network interface.

Figure 2A:
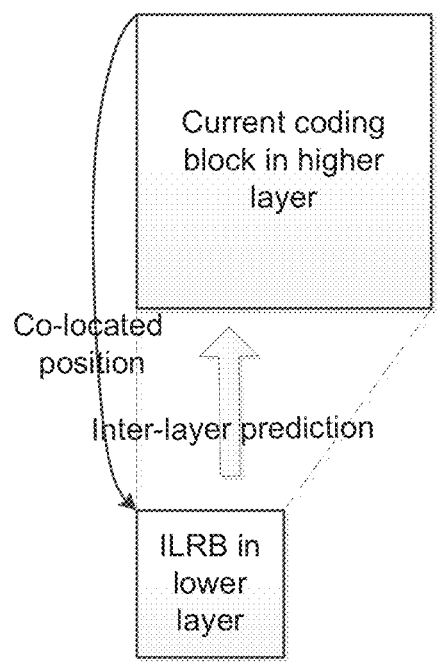
FIG. 2A shows a position of co-located lower layer block.

In the previous SVC standards and systems, only one reference block can be used when an EL block is coded. If the block is inter-predicted, the TRB will be used. However, if the block is inter-layer predicted, the ILRB will be used. In known SVC standards and systems, when applying inter-layer pixel/reconstruction prediction or inter-layer residual prediction, a co-located block of a lower layer is marked to be used as an inter-layer reference block (ILRB). Co-located means that a region covers the same coordinates in a base layer and an enhancement layer. For example, FIG. 2A shows that the position of co-located lower layer block is exactly aligned to the current coding block a higher layer. However, use of the co-located lower layer block may not result in best compression performance. In other words, encoding the current coding block using the co-located lower layer block might not provide a desirable rate-distortion cost. In some cases, the desired rate-distortion cost is the lowest rate-distortion cost. Rate-distortion cost can be a measure of amount of distortion (loss of video quality) against the amount of data required to encode the video. Various techniques are available for measuring rate-distortion cost.

Figure 2B:
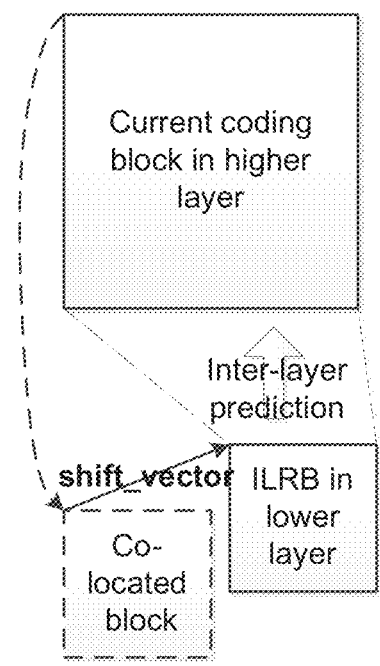
FIG. 2B depicts an example of use of an inter-layer reference block that may not be co-located in a different layer.

FIG. 2B depicts an example of use of an inter-layer reference block that may not be co-located in a different layer. A two dimensional offset parameter, shift_vector, can be used to specify an upper left corner pixel coordinate of an ILRB relative to a block in the same layer as the ILRB that is co-located with respect to the current coding block. For example, if shift_vector has parameters (Hor, Ver), then the co-located position is the original point and with the shift_vector equal to (0, 0). If Hor is positive value, ILRB is below the co-located position. If Hor is a negative value, ILRB is above the co-located position. If Ver is a positive value, ILRB is on the right of the co-located position but if Ver is a negative value, ILRB is on the left of the co-located position. Other conventions can be used to identify an upper left pixel coordinate location of an ILRB.

Various embodiments provide a manner to identify one or more candidate reference blocks used to generate a prediction block to encode a current coding block. The candidate reference blocks can be in the same layer as the current coding block or a different layer. In addition, the candidate reference blocks do not have to be co-located with the current coding block. Motion vectors and shift vectors can be used to identify the candidate reference blocks. In addition, uniform and non-uniform weighting can be applied to the candidate reference blocks to generate the prediction block. Accordingly, an encoder can determine and identify reference blocks to a decoder that can provide desirable rate-distortion cost. Accordingly, quality of video can be improved while maintaining a same bandwidth used to transmit the video.

Various embodiments provide for use of multiple reference blocks to encode a block. In some embodiments, four kinds of reference blocks are available for use in coding the current coding block. However, other numbers of reference blocks can be used. For example:

1. Temporal reference block (TRB) is a block of a temporal reference picture in the same layer and can be specified by a temporal motion_vector.

2. Inter-layer reference block (ILRB) is a block of a corresponding picture in a lower layer and can be specified by a shift_vector. For example, if layer 0 is a base layer, then blocks in layer 1 can use ILRBs from layer 0 and blocks in layer 2 can use ILRBs from layers 0 and 1. If spatial scalability is used, the block in the lower layer may be up-sampled to the size of the current coding block. Up-sampling can include pixel interpolation and scaling to the resolution of the layer of the current coding block.
3. T+ILRB is an ILRB of a TRB. If spatial scalability is used, the block of a lower layer may be up-sampled to the size of the current coding block.
4. IL+TRB is a TRB of a ILRB. If spatial scalability is used, the block of a lower layer may be up-sampled to the size of the current coding block.

Figure 3:
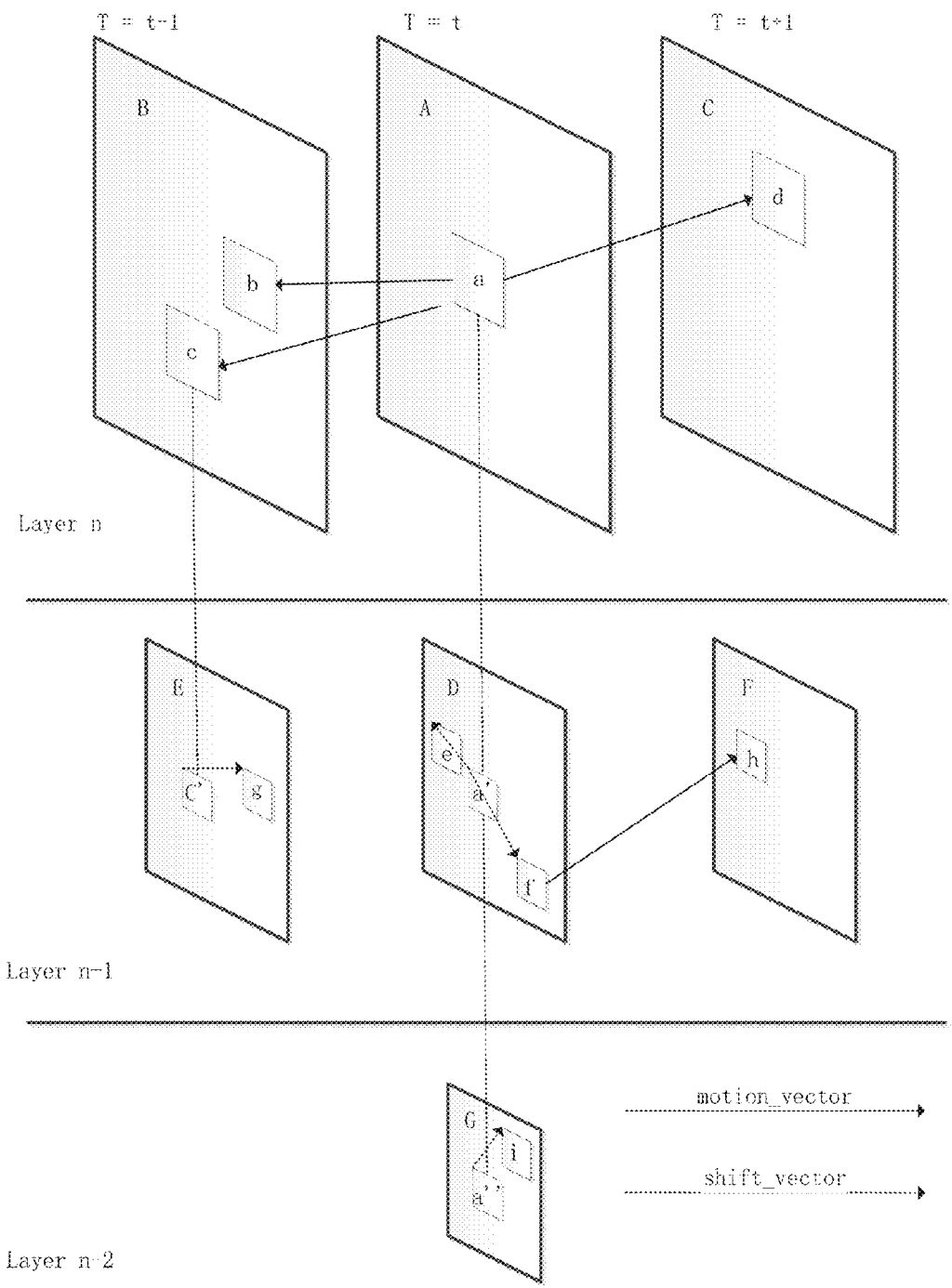
FIG. 3 shows an example in which multiple reference blocks can be searched and potentially used to code a current coding block.

FIG. 3 shows an example in which multiple reference blocks can be searched and potentially used to code a current coding block. Picture A is the current coding picture and has a layer id=n and temporal id=t. Picture A has two temporal reference pictures: (1) forward reference picture B whose temporal id is equal to t−1 and (2) backward reference picture C whose temporal id is equal to t+1. In layer n−1, picture D is the corresponding picture of picture A. Picture D has the same temporal id with picture A. Pictures E and F are respective temporal forward and backward reference pictures of picture D. The temporal ids of pictures E and F are t−1 and t+1, respectively. In layer n−2, picture G is the corresponding of picture A.

For example, when block a of picture A is the current coding block, a multiple reference block list of reference blocks b to i can be generated. The following is an example of a reference block list.
1. Blocks b, c, and d are TRBs of block a, and can be located using motion_vectors.
2. Blocks e and f are ILRBs of block a in layer n−1 (block a in layer n−1 is shown as a'), and can be located using shift_vectors. Upsampling of blocks e and f may be applied to match their pixel dimensions to that of block a.
3. Block g is a T+ILRB of block a in layer n−1. Block g can be derived from an existing TRB c by using a shift_vector relative to c', which is the co-located version of block c in layer n−1. Upsampling of block g may be applied to match its pixel dimensions to that of block a.
4. Block h is an IL+TRB of block a in layer n−1. Block h can be derived from an existing ILRB f by using f's motion_vector. Upsampling of block h may be applied to match its pixel dimensions to that of block a.
5. Block i is an ILRB of block a in layer n−2 (which is shown as a"). Block i can be located using a shift_vector. Upsampling of block i may be applied to match its pixel dimensions to that of block a.

The reference block list building process could be adaptive or fixed. Reference blocks can be selected that have the lowest sum of absolute difference (SAD) relative to the current coding block. In an adaptive implementation, reference blocks can be selected and ordered based on their relative SAD values from lowest to highest.

In an implementation, a reference block list is set up so that all the ILRBs are added to the list with their layer distances in increasing order. Next, all the TRBs can be added into the tail of the list, with their temporal distances in increasing order. Then, all the T-ILRBs can be added into the tail of the list, with their layer distances in increasing order. Then, all the IL-TRBs can be added into the tail of the list, with their temporal distances in increasing order.

In some embodiments, not all identified reference blocks are used to encode a block of interest. The encoder can select one or more reference blocks to use from the reference block list. For example, rate-distortion (RD) cost can be used to select the reference blocks that result in the lowest RD cost. Non-RD cost determination can be used to select reference blocks.

For the RD cost based approach to select one or more reference blocks, one example implementation is to find a single best reference block. The encoder can build a list of reference blocks and each reference block is marked by an index. RD cost can be calculated for each reference block by using the equation:

$$RD(i)=SAD(i)+lambda*Bits(i)$$

where:
SAD(i) indicates the SAD value between the original block pixel sample and the reference block pixel block and
Bits(i) is the resulting number of coding bits when using this reference block.

The reference block with smallest RD(i) can be used for final encoding and its index sent to decoder.

Another example implementation identifies multiple reference blocks for use to code a block of interest. Multiple reference blocks could be searched to identify M blocks. An RD cost equation could be:

$$RD(i0, i1, \ldots, iM)=SAD(i0, i1, \ldots, iM)+ lambda*Bits(i0, i1, \ldots, iM)$$

Accordingly, the encoder finds the best combination of M blocks by finding the M blocks which produce the lowest RD cost. The indices of the best reference blocks can be provided by the encoder for transmission to the decoder. The decoder can use the reference blocks identified for use to decode a block.

A non-RD based approach to identify reference blocks for use to code a block can be as follows. The order of reference blocks can be fixed and use of the first N available blocks could be identified as the reference blocks. The temporal and layer distance can be used as the metric for ordering. The weighting factors can also be fixed. For example, the largest weighting factor is given to the first reference block, the second largest weighting factor is given to the second reference block, and so on. For example, a first reference block can be that which has lowest temporal and lowest layer distance from the block of interest and so forth.

A syntax called best_reference_block_idx can signal the index in the bitstream. In some embodiments, the general coding unit syntax of sections 7.3.9.1 or 7.3.10 of High Efficiency Video Coding (HEVC) Text Specification draft 8 (2012) from JCT-VC can be used to transmit best_reference_block_idx.

At the decoder side, a reference block list is reconstructed. For the adaptive-based RB list, e.g., RD-cost based, the decoder can construct the list. For the fixed method RB list, the decoder can construct the list in a similar manner as the encoder constructed the list. The decoder selects the best reference block according to best_reference_block_idx to finish the decoding process. In some cases, the decoder selects from among the best reference blocks. In some cases, several reference blocks having the lowest RD cost can be identified to the decoder. If there is no received best_reference_block_idx, decoder can use all the available reference blocks.

In some cases, a parameter max_active_reference_block_num having value N can be formed by or at instruction of the encoder to inform a decoder to use the first N available reference blocks, instead of all the reference blocks. The parameter max_active_reference_block_num can be transmitted to a decoder using Sequence Parameter Set (SPS), Picture Parameter Set (PPS), or slice header. Using fewer than all available reference blocks can benefit the decoder by using less buffer size. SPS is described for example in section 7.3.2.2 in High Efficiency Video Coding (HEVC) Text Specification draft 8 (2012) and PPS is described in section 7.3.2.3 in High Efficiency Video Coding (HEVC) Text Specification draft 8 (2012). Syntaxes controlling the whole video or whole picture can be transmitted in SPS and PPS.

After multiple reference blocks are selected, at the encoder, a prediction block can be determined. Assuming there are N reference blocks, including TRBs, ILRBS, T+ILRBs and IL+TRBs, a predicted block can be calculated by the following equation, $$\text{pred} = w_0 * \text{ref}_0 + w_1 * \text{ref}_1 + \ldots + w_N * \text{ref}_N + o$$

where:
pred indicates the resulting predicted block;
$w_0$ to $w_N$ are weighting factors; and
$\text{ref}_0$ to $\text{ref}_N$ refer to the multiple reference blocks.

All pixel sample values in the reference blocks are multiplied by weighting factors. Specifically, luma and chroma values are multiplied by weighting factors.

For the prediction block, pred, the weighting factors $w_0$ to $w_N$ control the magnitude of each reference block as well as the offset factor o. In some implementations, default weighting factors and offset factor are used. In some implementations, the weighting factors and offset factor are generated by an encoder and sent to a decoder.

The weighting factor can be determined in different ways, for example:
1. In some implementations, a simple average is used, so all the weighting factors are equal to 1/N and
2. In some implementations, the weighting factors are related to the temporal and spatial distance to the current coding block. When the motion_vector/shift_vector values are larger, a smaller weighting factor will be used, because the reference block is further away from the current coding block.

The offset factor o can be used to tune the weighted prediction result for flexibility. The offset factor can be determined by the encoder. If the encoder detects the weighted prediction result is always smaller than original pixel value, a positive offset factor can be used and vice versa.

Motion vectors and shift vectors, as the case may be, identify positions of the reference blocks $\text{ref}_0$ to $\text{ref}_N$ that are used to encode the prediction block, pred. Motion vectors and shift vectors can be provided by the encoder for transmission to the decoder.

In some implementations, the shift_vector can be signaled at a block level, which means each CU/PU/TU may have a different shift_vector. In other implementations, the shift_vector can be signaled at slice/picture/layer level, which means all blocks belonging to the slice/picture/layer may use the same regional shift vector. In some cases, after the rate distortion cost based reference block selection for all the blocks in the slice, most of the shift vectors are centralized to some value. This centralized value can be chosen as the regional shift vector. Coding the centralized shift vector at the slice level might benefit most of blocks in the slice. Use of a slice/picture/layer regional shift vector can avoid use of bits that would have been used to code the shift vectors for each block. A regional shift vector means the same shift vector is used to decode blocks or regions in the slice/picture/layer level. In some implementations, all blocks in the same slice/picture/layer use the regional shift vector to find their ILRBs.

In some cases, each block can also transmit a delta shift vector and the actual shift vector used to locate an ILRB can be obtained by summing the regional shift vector with the delta shift vector.

If block a is the current coding block in picture A and prediction block pred is used for coding block a, an error difference between the block a and the prediction block pred is a residual. The residual will be transformed, quantized, and entropy coded into a bitstream and provided for transmission to a decoder.

FIG. 4 depicts an example process used by an encoder to encode a block.

Block 401 includes selecting one or more candidate reference blocks for use in encoding a candidate block. The candidate block can be any dimensions. For example, the candidate block can be square, rectangular, triangular, circular, or any shape. For example, candidate block can be a rectangular block having a variable size. The candidate block can be an HEVC CU. For example, the one or more candidate reference blocks can be in the same layer or different layer than that of the candidate block. The one or more reference blocks may not be co-located with the candidate block in the different layer. For each candidate reference block within the same layer as the candidate reference block, a motion vector with x, y coordinates and reference picture index component can be used to identify offset of the candidate reference block from the candidate block. When the candidate reference block is in a different layer but in the equivalent frame, a shift vector can be used to identify a location of the candidate reference block relative to a co-located candidate block in the same layer as the candidate reference block. When the candidate reference block is in a different layer and in a different frame, a motion vector relative to the co-located candidate block and a shift vector can be used to identify a location of the candidate reference block relative to a co-located candidate block.

One or more reference blocks can be selected based on RD cost or distance from the candidate block.

Block 402 includes determining weighting applied to the selected one or more candidate reference blocks. Based on the determined weighting, the candidate reference blocks may all be used to form a prediction block for the candidate block. Techniques for determining weighting factors are described earlier.

In some cases, block 402 could also include determining an offset factor. Determination of offset factor is described earlier.

Block 403 includes providing encoding parameters for transmission to a decoder. The encoding parameters can include layer indices of every candidate reference block, motion vectors, shift vectors, weighting factors, and offset for the candidate reference blocks. A residual difference the prediction block and the candidate block can be quantized and entropy encoded and provided for transmission to the decoder.

Transmission of the parameters can take place using a video bitstream. Syntax information in the bitstream can be used to transmit parameters.

Figure 5:
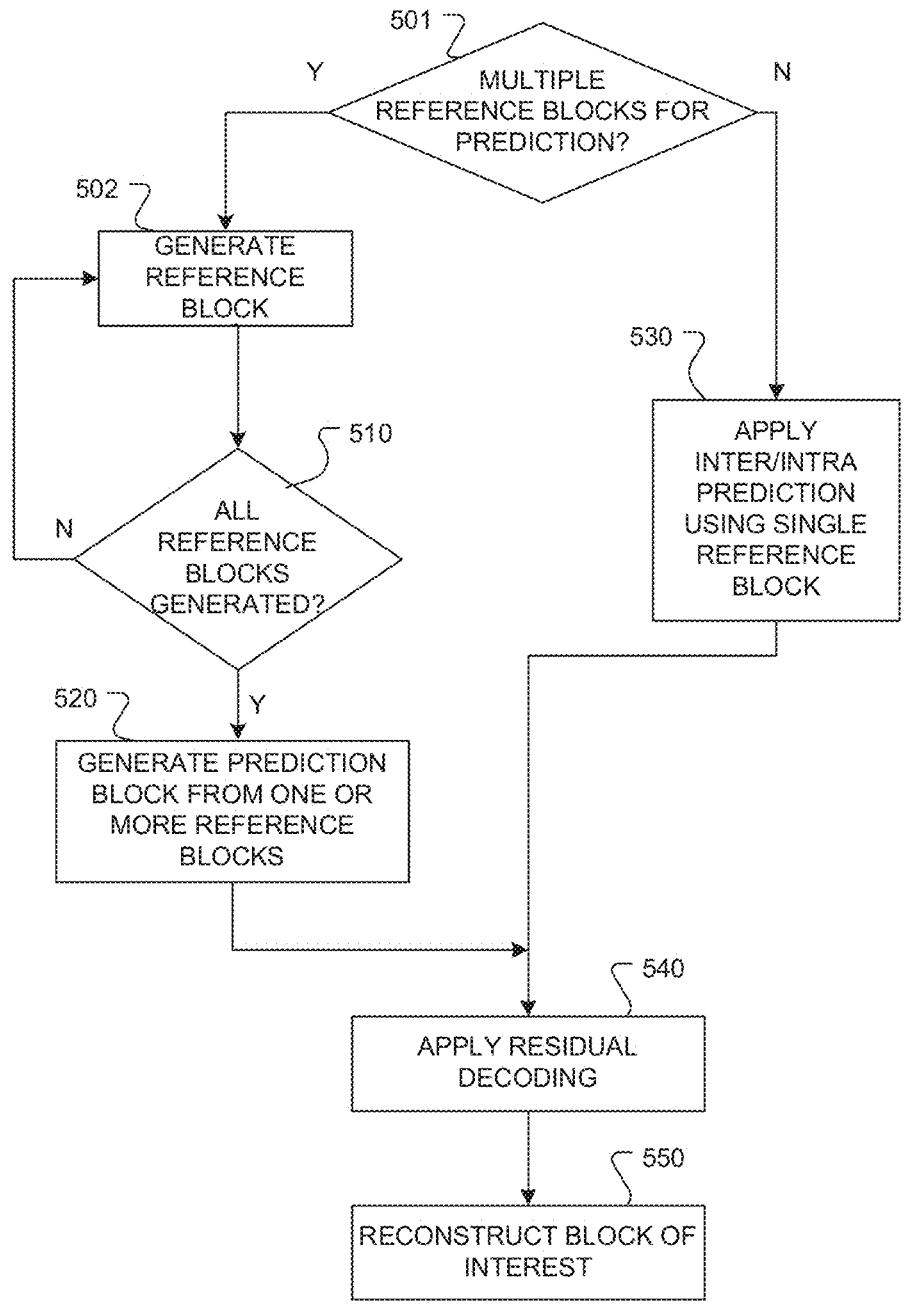
FIG. 5 depicts an example process used by a decoder to decode a block based on one or more candidate reference blocks.

FIG. 5 depicts an example process used by a decoder to decode a block based on one or more candidate reference blocks. The block can be any pixel sized square or rectangle or other shapes. The block to be decoded can be an HEVC CU.

Block 501 includes determining whether multiple reference blocks are used for a prediction block. The prediction block can be used to decode a block. If multiple reference blocks are used to determine a prediction block, then block 502 can follow block 501. If multiple reference blocks are not used to determine a prediction block, then block 530 can follow block 501. Each reference block can be identified using a layer index, motion vector, or a shift vector. Reference blocks can be identified by a video encoder.

Block 502 includes generating a reference block. A technique for generating a reference block depends on the type of the reference block. A decoder can know whether reference block is ILRB, TRB, T+ILRB, or IL+TRB based on parameters received with the reference block. For example, if there is just a received motion vector but no shift vector, the decoder knows reference block is a TRB. If there is just a received shift vector but no motion vector, the decoder knows reference block is an ILRB. If a TRB has its own shift vector, then the reference block identified using the shift vector is a T+ILRB. If an ILRB has its own motion vector, then the reference block identified using the motion vector is an IL+TRB.

Generating a TRB can include using a received motion vector to identify an upper left coordinate of the TRB relative to a location of a block to be decoded.

Generating an ILRB can include using a received shift vector to identify an upper left coordinate of the ILRB relative to a co-located block in a lower level. A decoder can determine a layer level of the ILRB based on information received in the video stream. In addition, up-sampling can be applied to translate the ILRB to the dimensions and resolution of block to be decoded.

Generating a T+ILRB can include (a) using a received motion vector to identify an upper left coordinate of a TRB relative to a location of a block to be decoded and (b) using a shift vector to identify an upper left coordinate of the T+ILRB relative to a co-located block of the TRB in a lower level.

Generating an IL+TRB can include (a) using a shift vector to identify an upper left coordinate of a block in a lower level relative to a co-located block and (b) using a received motion vector to identify an upper left coordinate of the IL-TRB relative to a location of the block identified using the shift vector.

If spatial scalability is used, the block in the lower layer may be up-sampled to the size of the current coding block. Up-sampling can include pixel interpolation and scaling to the resolution of the layer of the current coding block.

The resolution of shift_vector can be integer or fractional. When the shift_vector has a fractional resolution, an interpolation filter is used to generate the actual ILRB. Various of interpolation filters can be used, including but not limit to bilinear filter, bi-cubic filter, poly-phase FIR filters, and so forth.

Block 510 includes determining whether all reference blocks provided for use in decoding a block of interest have been identified. The relevant reference blocks can be identified by an encoder. Block 502 repeats until block 510 indicates all reference blocks have been generated.

Block 520 includes generating a prediction block from one or more reference blocks. For example, the prediction block can be generated from weighting of each of the one or more reference blocks. Weighting of each of the reference blocks can be different or the same. An example manner to generate the prediction block is described earlier.

Block 530 includes applying inter or intra prediction using a single reference block to determine a prediction block for a block of interest. Techniques suggested with respect to HEVC as well as any variety of H.264 and MPEG can be used for inter or intra prediction of the prediction block.

Block 540 includes applying residual decoding to the prediction block. The prediction block can be determined using one or more reference blocks. Residual values can be provided by an encoder of the video and can be received in entropy encoded format. Block 540 includes decoding the residual values. Decoding residual values can include applying entropy decoding and inverse quantization. Residual values may include pixel difference values between pixels in the original pre-encoded block of interest and pixels in a predicted block.

Block 550 includes reconstructing a block of interest. Reconstructing the block of interest can include summing residual values with the prediction block on a per pixel basis. The resulting block of interest is a reconstructed version of an encoded block.

FIG. 6 depicts an example manner to transport reference block indices and shift vectors to a decoder. The expressions and parameters shown in FIG. 6 can be used in a video stream to identify reference block index numbers and horizontal and vertical values of shift vectors for each of the reference blocks. In addition, the shift vectors are associated with a particular layer and can be transmitted from lowest layer to highest reference layer. Reference blocks can be TU, PU, CU, slice, picture, or layer level. In some embodiments, to transmit indices and syntax_vectors of reference blocks, the general coding unit syntax of sections 7.3.9.1 or 7.3.10 of High Efficiency Video Coding (HEVC) Text Specification draft 8 (2012) from JCT-VC.

The following provides a table of parameters referenced in FIG. 6 that can be transmitted to a decoder.

| Name | Brief Description |
| --- | --- |
| layerID | Layer number of reference block |
| inter_layer_reference_block_num | Reference block index number |
| shift_vector_hor | Horizontal offset of shift vector |
| shift_vector_ver | Vertical offset of shift vector |
| weighting_factor | Weighting factor for a specified reference block in a specified layer |
| offset_factor | Offset factor to determine prediction block |

Figure 7:
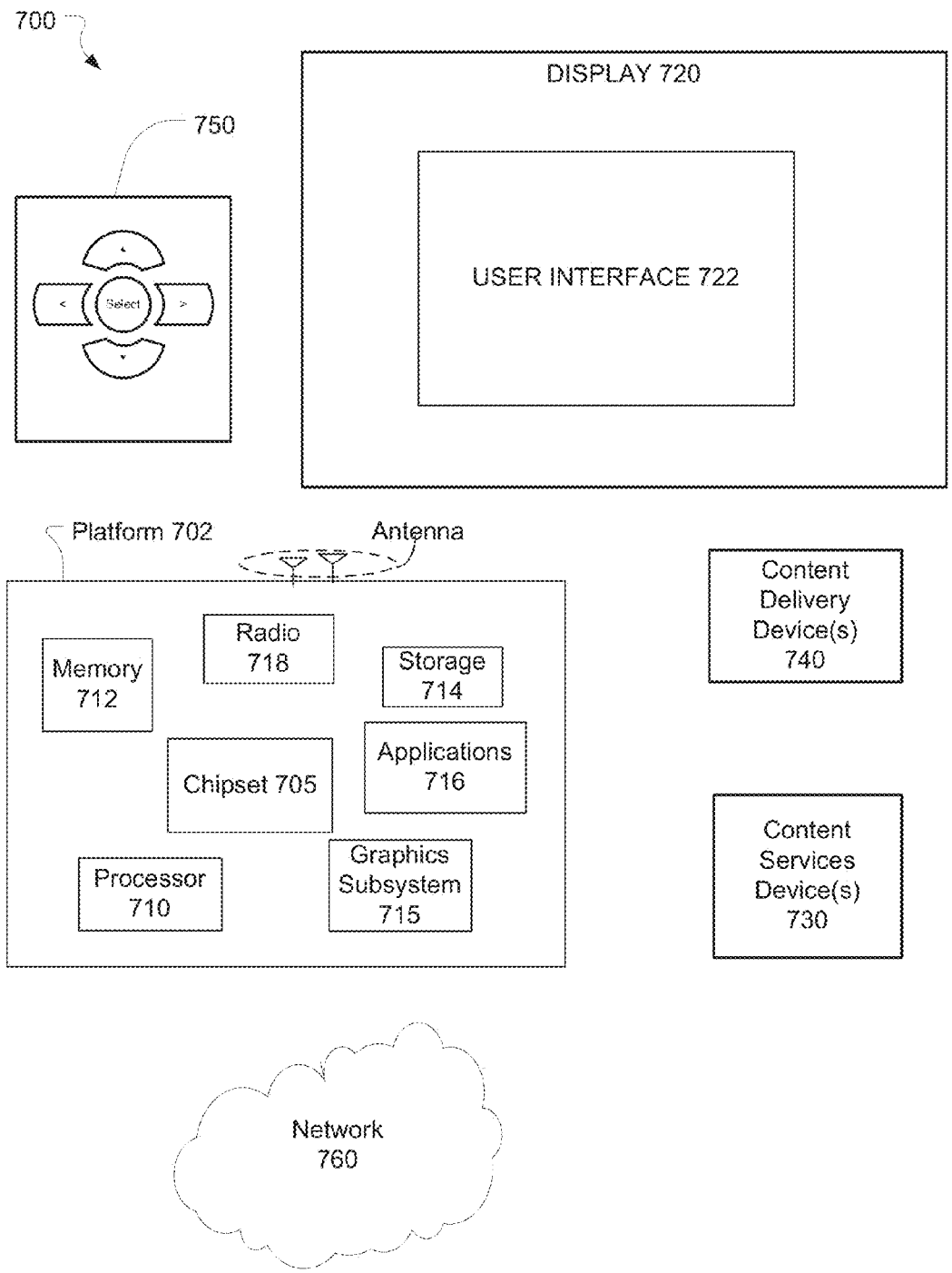
FIG. 7 illustrates an embodiment of a system.

FIG. 7 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 includes a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below. In some cases, platform 702 can be communicatively to display 720 through a display interface.

In embodiments, platform 702 may include any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may include dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may include technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. Various embodiments of VPU can provide video encoding or decoding using hardware, software, and/or firmware. Various embodiments of VPU can use embodiments described herein. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may include any television type monitor or display. Display 720 may include, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may include a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may include technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

Figure 8:
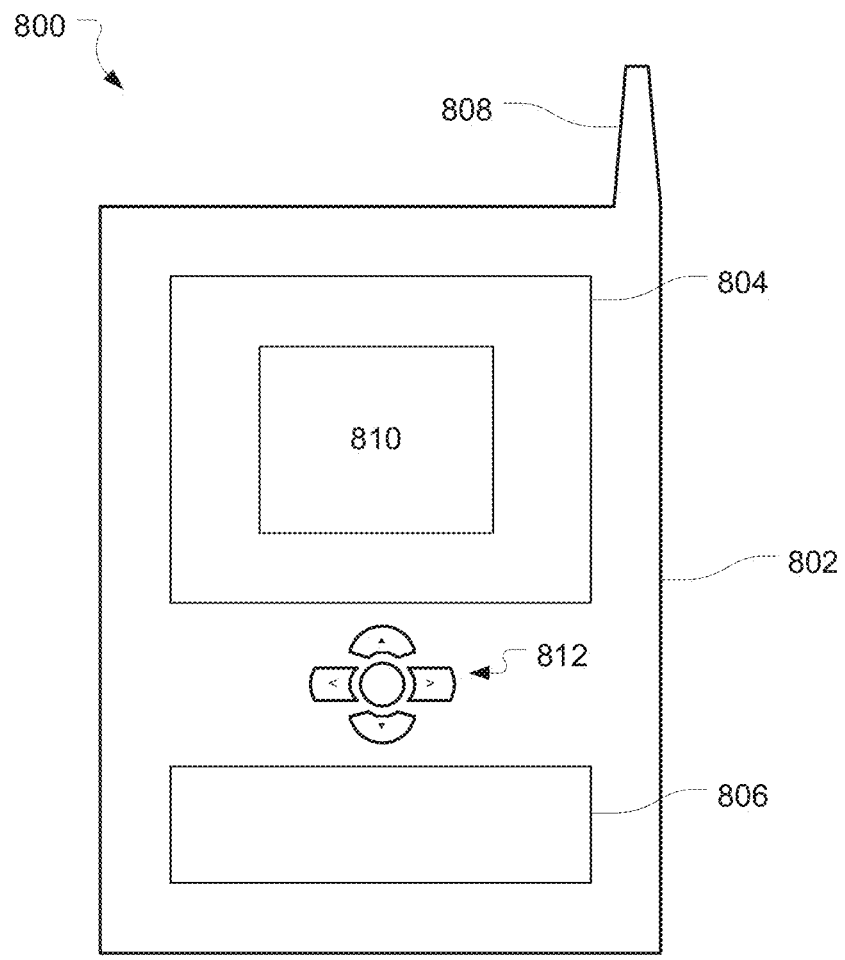
FIG. 8 shows a device.

As described above, system 700 may be embodied in varying physical styles or form factors. FIG. 8 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

FIG. 8 shows a device 800 that can use embodiments of the present invention. Device 800 includes a housing 802, a display 804, an input/output (I/O) device 806, and an antenna 808. Device 800 also may include navigation features 812. Display 804 may include any suitable display unit for displaying information appropriate for a mobile computing device. I/O device 806 may include any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The term "logic" may include, by way of example, software or hardware and/or combinations of software and hardware.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or displays. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Embodiments may include an apparatus to decode an image region, the apparatus can include: circuitry, logic, or one or more processors programmed, configured, or adapted to: identify a first reference region based at least in part on parameters, the first reference region located in a lower layer than the image region and the first reference region either co-located or not co-located to the image region; form a prediction region based at least on the first reference region; and form the image region based at least on the prediction region and a residual value.

Embodiments may include a computer-implemented method, the method can include: accessing parameters from a received video stream, the parameters identifying one or more reference regions, the parameters comprising one or more motion vectors, one or more shift vectors, a layer identifier, one or more reference block indices, and weighting factors for the one or more reference regions; determining a prediction region based on the one or more reference regions and the weighting factors; determining a residual value from at least a portion of the received video stream; and forming a first region based on the prediction region and the residual value.

Embodiments may include a system to encode an image region relative to one or more reference regions. The system can include: circuitry, logic, or a processor programmed, configured, or adapted to: identify or locate one or more reference regions in a lower layer than that of the image region; determine or compute weighting applied to each of the one or more reference regions; and provide encoding parameters for transmission to a device with a video decoder or to a video decoder.

Embodiments may include a method to encode an image region relative to one or more reference regions. The method can include identifying or locating one or more reference regions in a lower layer than that of the image region; determining or computing weighting applied to each of the one or more reference regions; and providing encoding parameters for transmission to a device with a video decoder or to a video decoder.

Embodiments may include a method to encode a first region of video for encoding, the method including: identifying a first region of video for encoding; determining one or more reference regions for encoding the first region, the one or more reference regions in a lower layer than that of the first region and co-located or not co-located with the first region; ordering the one or more reference regions; and determining weighting factors for the one or more reference regions for encoding the first region.

The one or more reference regions in a lower layer than that of the image region can be identified or located using one or more motion vector and/or one or more shift vector. In addition, the one or more reference regions can be selected by identifying a region or regions with a lowest or low rate distortion cost. The weighting applied to each of the reference regions can be uniform or non-uniform. In some cases, the parameters can identify the best or several best reference regions for the decoder to use. The parameters can include one or more motion vectors, one or more shift vectors, a layer identifier, at least one reference block index, weighting factors, and an offset factor. The parameters can be transported to a receiver using coding unit syntax of sections 7.3.9.1 or 7.3.10 of High Efficiency Video Coding (HEVC) Text Specification draft 8 (2012) from JCT-VC. In addition, the system can include: circuitry, logic, or a processor programmed, configured, or adapted to: determine or calculate a residual between a prediction region and the image region and quantize and entropy encode the residual for transmission to a device with a decoder or a decoder. The method can include determining or calculating a residual between a prediction region and the image region and quantize and entropy encode the residual for transmission to a device with a decoder or a decoder.

The invention claimed is:

1. An apparatus to decode an image region of a current picture, the apparatus comprising a circuitry; and
one or more processors configured to:
identify a first reference region based at least in part on parameters via a bitstream, the first reference region located in a reference picture in a lower layer than the image region and the first reference region not co-located with and not aligned to the image region, wherein the current picture and the reference picture have the same temporal identity, and wherein to identify the first reference region, the one or more processors are to, in response to the first reference region being an inter-layer reference region, apply a shift vector received via the parameters of the bitstream and corresponding to the image region of the current picture, wherein the shift vector provides a shift relative to a co-located region in the reference picture of the lower layer to identify the first reference region, wherein the co-located region is co-located with the image region;
identify a second reference region based at least in part on the parameters, the second reference region located in a lower layer than the image region and the second reference region not co-located with and not aligned to the image region;
form a prediction region based at least on the first reference region and the second reference region, wherein the first and second reference regions provide part of a lowest rate-distortion cost to code the image region, and wherein to form the prediction region, the one or more processors are to apply a first weighting factor for the prediction region to the first reference region, and apply a second weighting factor for the prediction region to the second reference region, wherein the first weighting factor for the prediction region is greater than the second weighting factor for the prediction region based on a first spatial and temporal distance between the first reference region and the image region being smaller than a second spatial and temporal distance between the second reference region and the image region; and
form the image region based at least on the prediction region and a residual value.

2. The apparatus of claim 1, wherein to identify a second reference region, the one or more processors are to, in response to the second reference region being an inter-layer reference region, apply a second shift vector to the co-located region to locate the second reference region in the reference picture.

3. The apparatus of claim 1, wherein to identify a second reference region, the one or more processors are to, in response to the second reference region being a temporal reference region relative to an inter-layer reference region, apply a second shift vector to the co-located region to locate the inter-layer reference region in the reference picture, and apply a motion vector to locate the second reference region in a second reference picture relative to the inter-layer reference region.

4. The apparatus of claim 1, wherein to identify a second reference region, the one or more processors are to, in response to the second reference region being an inter-layer reference region relative to a temporal reference region, apply a motion vector to the image region to locate the temporal reference region in a second reference picture, and apply a second shift vector to locate the second reference region in a third reference picture relative to the temporal reference region.

5. The apparatus of claim 1, wherein the one or more processors are to construct a reference region list including, in order, one or more temporal reference regions, one or more inter-layer reference regions, one or more inter-layer reference regions of one or more temporal reference regions, and one or more temporal reference regions of one or more inter-layer reference regions, and to select multiple reference regions for decoding from the reference region list, wherein the multiple reference regions comprise the first reference region.

6. The apparatus of claim 5, wherein to select the multiple reference regions for decoding, the one or more processors are to identify the multiple reference regions having a lowest rate distortion cost.

7. The apparatus of claim 1, wherein the one or more processors are to:
construct a list of reference regions including at least the first reference region and the second reference region; and
determine a set of M reference regions of the list of reference regions providing a lowest rate-distortion (RD) cost to code the image region, wherein the RD cost is calculated based upon a sum of absolute difference (SAD) corresponding to the set of M reference regions summed with a multiple of a number of coding bits corresponding to the set of M reference regions, and wherein the set of M reference regions has a number N of reference regions established by a maximum number of reference blocks received via the parameters;
apply a respectively corresponding list of N prediction region weighting factors to the first N reference regions of the list of reference regions; and
sum the weighted first N reference regions of the list of reference regions to form the prediction region.

8. A system comprising:
a display;
a wireless network interface; and
a circuitry communicatively coupled to the display and to the wireless network interface, the circuitry to form an image region of a current picture, wherein the circuitry to form the image region is to:
locate a first reference region based at least in part on parameters received via a bitstream, the first reference region located in a reference picture in a lower layer than the image region and the first reference region not co-located with and not aligned to the image region, wherein the current picture and the reference picture have the same temporal identity, and wherein to locate the first reference region, the circuitry is to, in response to the first reference region being at least an inter-layer reference region, apply a shift vector received via the parameters of the bitstream and corresponding to the image region of the current picture, wherein the shift vector provides a shift relative to a co-located region in the reference picture of the lower layer to identify the first reference region, wherein the co-located region is co-located with the image region;

identify a second reference region based at least in part on the parameters, the second reference region located in a lower layer than the image region and the second reference region not co-located with and not aligned to the image region;

generate a prediction region based at least on the first reference region and the second reference region, wherein to generate the prediction region, the circuitry is to apply a first weighting factor for the prediction region to the first reference region, apply a second weighting factor for the prediction region to the second reference region, and sum the weighted first and second reference regions to generate the prediction region, wherein the first weighting factor for the prediction region is greater than the second weighting factor for the prediction region based on a first spatial and temporal distance between the first reference region and the image region being smaller than a second spatial and temporal distance between the second reference region and the image region; and form the image region based at least on the prediction region and a residual value.

9. The system of claim 8, wherein to identify a second reference region, the circuitry is to, in response to the second reference region being an inter-layer reference region, apply a second shift vector to the co-located region to locate the second reference region in the reference picture.

10. The system of claim 8, wherein to locate a second reference region, the circuitry is to:
in response to the second reference region being a temporal reference region relative to an inter-layer reference region, apply a second shift vector to the co-located region to locate the inter-layer reference region in the reference picture, and apply a motion vector to locate the second reference region in a second reference picture relative to the inter-layer reference region.

11. The system of claim 8, wherein to locate a second reference region, the circuitry is to, in response to the second reference region being an inter-layer reference region relative to a temporal reference region, apply a motion vector to the image region to locate the temporal reference region in a second reference picture, and apply a second shift vector to locate the second reference region in a third reference picture relative to the temporal reference region.

12. The system of claim 8, wherein the circuitry is to construct a reference region list including, in order, one or more temporal reference regions, one or more inter-layer reference regions, one or more inter-layer reference regions of one or more temporal reference regions, and one or more temporal reference regions of one or more inter-layer reference regions, and to select multiple reference regions for decoding from the reference region list, wherein the multiple reference regions comprise the first reference region.

13. The system of claim 8, wherein the circuitry is to:
construct a list of reference regions including at least the first reference region and the second reference region; and
determine a set of M reference regions of the list of reference regions providing a lowest rate-distortion (RD) cost to code the image region, wherein the RD cost is calculated based upon a sum of absolute difference (SAD) corresponding to the set of M reference regions summed with a multiple of a number of coding bits corresponding to the set of M reference regions, and wherein the set of M reference regions has a number N of reference regions established by a maximum number of reference blocks received via the parameters;
apply a respectively corresponding list of N prediction region weighting factors to the first N reference regions of the list of reference regions; and
sum the weighted first N reference regions of the list of reference regions to generate the prediction region.

14. A computer-implemented method comprising:
accessing parameters from a received video stream, the parameters identifying one or more reference regions, the parameters comprising one or more motion vectors, one or more shift vectors, a layer identifier, one or more reference region indices, and prediction region weighting factors for the one or more reference regions;
identifying the one or more reference regions including identifying a first reference region, the first reference region located in a reference picture in a lower layer than an image region being decoded, wherein the image region is in a current picture, and the first reference region not co-located with and not aligned to the image region, wherein the current picture and the reference picture have the same temporal identity, and wherein identifying the first reference region, in response to the first reference region being at least an inter-layer reference region, includes applying a shift vector of the one or more motion vectors corresponding to the image region of the current picture, wherein the shift vector provides a shift relative to a co-located region in the reference picture of the lower layer to identify the first reference region, wherein the co-located region is co-located with the image region;
determining a prediction region based on the one or more reference regions and the prediction region weighting factors, wherein determining the prediction region comprises applying a first prediction region weighting factor to the first reference region, applying a second prediction region weighting factor to a second reference region of the one or more reference regions, and summing the weighted first and second reference regions, wherein the first prediction region weighting factor is greater than the second prediction region weighting factor based on a first spatial and temporal distance between the first reference region and the image region being smaller than a second spatial and temporal distance between the second reference region and the image region;
determining a residual value from at least a portion of the received video stream; and
forming the image region based on the prediction region and the residual value.

15. The method of claim 14, wherein identifying the one or more reference regions comprises identifying a second reference region, in response to the second reference region being an inter-layer reference region, and applying a second shift vector to the co-located region to locate the second reference region in the reference picture.

16. The method of claim 14, wherein identifying the one or more reference regions comprises identifying a second reference region, in response to the second reference region being a temporal reference region relative to an inter-layer reference region, applying a second shift vector to the co-located region to locate the inter-layer reference region in the reference picture, and applying a motion vector to locate the second reference region in a second reference picture relative to the inter-layer reference region.

17. The method of claim 14, wherein identifying the one or more reference regions comprises identifying a second reference region, in response to the second reference region being an inter-layer reference region relative to a temporal reference region, applying a motion vector to the image region to locate the temporal reference region, and applying a second shift vector to locate the second reference region relative to the temporal reference region.

18. The method of claim 14, further comprising:
constructing a reference region list including, in order, one or more temporal reference regions, one or more inter-layer reference regions, one or more inter-layer reference regions of one or more temporal reference regions, and one or more temporal reference regions of one or more inter-layer reference regions; and
selecting multiple reference regions for decoding from the reference region list, wherein the multiple reference regions comprise the first reference region.

19. The method of claim 14, further comprising:
constructing a list of reference regions including at least the first reference region and the second reference region; and
determining a set of M reference regions of the list of reference regions providing a lowest rate-distortion (RD) cost to code the image region, wherein the RD cost is calculated based upon a sum of absolute difference (SAD) corresponding to the set of M reference regions summed with a multiple of a number of coding bits corresponding to the set of M reference regions, and wherein the set of M reference regions has a number N of reference regions established by a maximum number of reference blocks received via the parameters;
applying a respectively corresponding list of N prediction region weighting factors to the first N reference regions of the list of reference regions; and
summing the weighted first N reference regions of the list of reference regions to form the prediction region.

* * * * *